Oct. 28, 1969 N. H. HERMAN ET AL 3,475,678
THREE-PHASE A.C. REGULATOR EMPLOYING D.C. CONTROLLED
MAGNETIC AMPLIFIERS
Filed Dec. 9, 1966

Neil H. Herman
Donat A. A. Vincent,
INVENTORS.

BY *Harry M. Saragovitz*
*Edward J. Kelly*
*Herbert Berl*
*Alfred E. Smith*

United States Patent Office 3,475,678
Patented Oct. 28, 1969

3,475,678
THREE-PHASE A.C. REGULATOR EMPLOYING D.C. CONTROLLED MAGNETIC AMPLIFIERS
Neil H. Herman and Donat A. A. Vincent, Pasadena, Calif., assignors, by mesne assignments, to the United States of America as represented by the Secretary of the Army
Filed Dec. 9, 1966, Ser. No. 600,704
Int. Cl. H02p *13/12;* H01f *29/14*
U.S. Cl. 323—89    1 Claim

ABSTRACT OF THE DISCLOSURE

An alternating current regulating device wherein magnetic amplifiers located in each phase of a three-phase system are controlled to provide a constant three-phase output voltage. The three-phase average voltage of the device is sensed by a Y—Y transformer connected across the load. The output of the transformer is rectified, filtered, and used to provide a D.C. current to the control windings of the magnetic amplifiers thereby providing a regulated output voltage from the device.

---

This invention relates in general to alternating current average regulators and more specifically to an alternating current regulator to average regulate an output voltage against input line voltage variations utilizing a magnetic amplifier as the regulating element.

A preferred embodiment of this invention employs magnetic amplifiers as regulating elements in a three-phase system that provides a regulated A.C. output conversion system. The system obtains a biasing voltage for the magnetic amplifier biasing windings from a rectifier-filter connected between one phase and neutral of a three-phase input source. The area under the output waveform is maintained constant by average sensing the load voltage to provide a feedback to adjust the control winding excitation. Magnetic amplifiers were chosen as regulating elements because of their adaptability to phase controlling voltage at high energy levels.

It is an object of the present invention to provide a regulated alternating current that is not affected by input voltage variations.

Another object of the present invention is to provide a regulated voltage with improved regulation, efficiency, and temperature response while maintaining a simplicity of design.

These and other objects and advantages of the present invention will become readily apparent when the following detailed description is referred to along with the claim and the accompanying drawing, in which:

Figure 1:
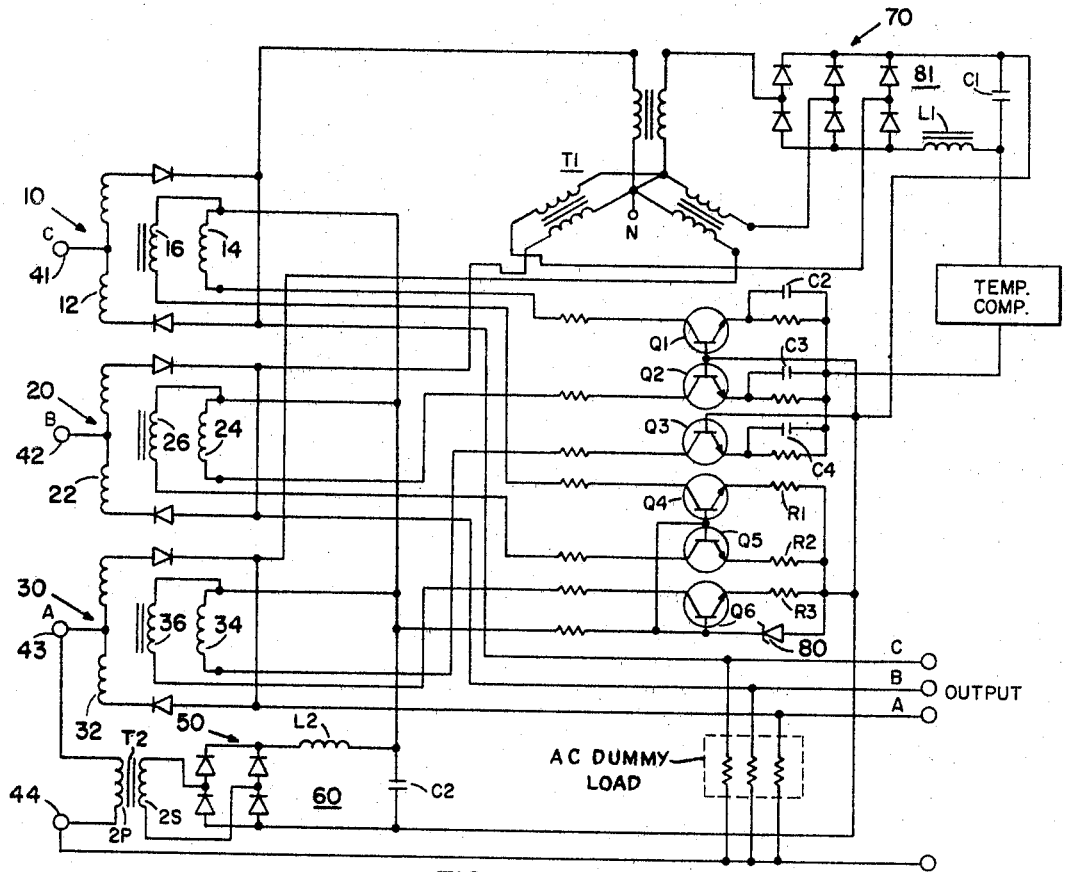
FIGURE 1 is a schematic diagram of a preferred embodiment of the invention.

Referring now to FIGURE 1, the basic mag-amp regulator concept is applied to a three-phase average regulator. Magnetic amplifiers 10, 20 and 30 have gate windings 12, 22 and 32 connected to input terminals 41, 42 and 43 respectively. The input terminals and neutral terminal 44 are connected to a three-phase voltage source. Transformer T2 has its primary winding 2p connected between input terminal 43 and neutral 44. Transformer T2 provides an output voltage that is rectified by rectifier 50 and filtered by filter 60 that provides source voltage for exciting control windings 14, 24 and 34 and bias windings 16, 26 and 36. Transformer T1 with associated rectifier 70 and filter 81 senses the three-phase average output voltage to provide the required control winding excitation to maintain a constant output. The bias point α for each mag-amp 10, 20 and 30 is set by sequentially adjusting trimpots R1, R2 and R3 which are connected in series with the collector-emitter circuits of transistors Q4, Q5 and Q6. The feedback control loop to the control windings is completed through transistors Q1, Q2 and Q3.

Temperature stabilization of the mag-amp bias point in the present invention has been accomplished by a combination of design features. It should be appreciated that, in the embodiment of FIGURE 1, 1 ma. in control windings 14, 24 and 34 or 5 ma. in bias windings 16, 26 and 36 can control as much as 250 watts of load power. For this reason, small circuit variations have extreme effects on biasing. The transistors are used strictly in the current mode first to isolate winding impedance variations in the collector circuits and secondly, to restrict winding excitation variations to the small collector-emitter gain variations. Zener diode 80 provides a current reference for transistors Q4, Q5 and Q6 and was chosen because its temperature coefficient most nearly compensates that of the transistor base-emitter diode. Additional temperature compensation is required to compensate for the copper resistance variations of the toroid L1. This is accomplished by inserting a thermistor circuit in the control feedback loop between filter 81 and transistors Q1, Q2 and Q3.

Loading effects are of particular importance when considering applications for this type of alternating current regulator. When numerous secondary voltages are required, transformer stepdown is necessary. Wave-shape distortion will definitely increase transformer losses, however, proper transformer design reflecting balanced loading per phase will not result in appreciable size increase. In the embodiment of FIGURE 1, secondary loading is provided by the Y—Y three-phase transformer: It is important that the primary of T1 be a Y with neutral connection so that any unbalanced currents will have neutral return instead of being reflected back into the mag-amps.

Transient response is theoretically limited to at least one-half cycle since this time is required for source variations to be sensed. Further response delays are caused by L1 and C1 in sensing filter 81 and by mag-amp correction time. Capacitors C2, C3 and C4 provide a lead network for compensating for the delay of filter 81. Overcompensation with the lead networks will cause low damping and can lead to oscillation.

Figure 2:
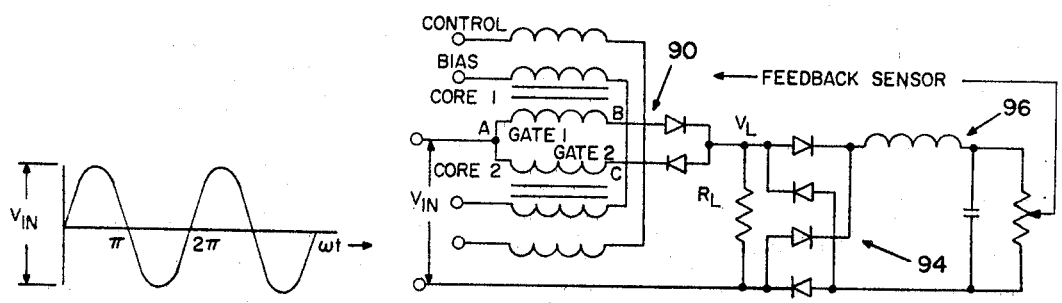
FIGURE 2 is a schematic diagram of a magnetic amplifier illustrating the principles of the present invention.
Figure 3:
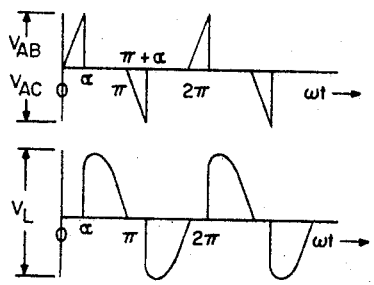
FIGURE 3 shows ideal waveforms of the voltages of the circuit of FIGURE 2.

Referring now to the magnetic amplifier circuit of FIGURE 2 and the waveforms of FIGURE 3, it is seen that in the interval from 0 to α, all the supply voltage appears across the gate winding since its reactance is much greater than the load resistance when core 1 is not saturated. At position α, core 1 saturates so that the load voltage rises instantaneously to the source voltage level (neglecting gate winding drop). Core 2 and the associated gate winding function identically during the negative half cycle. The position α is directly determined by the combined excitation in the control and bias windings. Magnetic amplifier 90 can be converted to an average regulator simply by average sensing the load voltage across RL with rectifier 94 and filter circuit 96 to provide feedback to adjust the control winding excitation. This feedback to the control winding maintains the area under the output waveform constant even with peak voltage variations.

What is claimed is:

1. A device for providing a regulated three-phase A.C. load voltage comprising: first, second, and third input terminals; first, second, and third output terminals; first, second, and third magnetic amplifiers having respective input terminals connected to respective ones of said input terminals of said device; a full-wave three-phase rectifier having input terminals; a Y—Y transformer having a respective input winding connected to each output terminal of said magnetic amplifiers, the output windings of said Y—Y transformer being connected to the inputs of said full-wave rectifier, said rectifier having first and second output terminal, a capacitor and an inductor; said second output terminal of said rectifier being connected to a first end of said inductor; a current generator having plural inputs; said first output terminal of said rectifier being connected to a first end of said capacitor and a first input of said current generator; a temperature compensating network; the second end of said capacitor being connected to the second end of said inductor and through said temperature compensating network to a second input of said current generator; said current generator having first, second, third, fourth, fifth, and sixth output terminals; said first, second, and third output terminals of said current generator connected to respective first sides of respective control windings of said first, second, and third magnetic amplifiers, said fourth, fifth, and sixth output terminals of said current generator connected to respective first sides of respective bias windings of said first, second, and third magnetic amplifiers; bias voltage means; the second sides of each said control winding and the second sides of each of said bias windings being connected to said bias voltage means for control and bias winding excitation; wherein the three-phase average output voltage from said device is sensed by the combination of said Y—Y transformer, said capacitor, and said inductor and a voltage is provided to excite said control windings to maintain a constant output voltage from said device.

References Cited
UNITED STATES PATENTS

| | | | |
|---|---|---|---|
| 2,875,396 | 2/1959 | Christie et al. | 323—89.10 X |
| 3,013,199 | 12/1961 | Hollingsworth et al. | 323—89.12 X |
| 3,075,139 | 1/1963 | Balteau | 323—66 |
| 3,268,798 | 8/1966 | Burski | 323—66 |
| 3,358,210 | 12/1967 | Grossoehme | 321—18 |
| 3,360,714 | 12/1967 | Borkovitz et al. | 323—89.12 X |
| 2,722,646 | 11/1955 | Rhyne et al. | |
| 2,806,990 | 9/1957 | Evans. | |
| 2,854,620 | 9/1958 | Steinitz. | |
| 2,901,682 | 8/1959 | Charbonneaux et al. | |
| 2,969,499 | 1/1961 | Phillips. | |

JOHN F. COUCH, Primary Examiner

P. GOLDBERG, Assistant Examiner

U.S. Cl. X.R.

321—25; 330—8